United States Patent

Cucé

[11] Patent Number: 5,809,486
[45] Date of Patent: Sep. 15, 1998

[54] FUZZY PROCESSING METHOD AND A PROCESSOR IMPLEMENTING THE SAME

[75] Inventor: Antonino Cucé, Messina, Italy

[73] Assignee: Consorzio per la Ricerca sulla Microelettronica nel Mezzogiorno, Catania, Italy

[21] Appl. No.: 812,574

[22] Filed: Mar. 7, 1997

[30] Foreign Application Priority Data

Mar. 29, 1996 [EP] European Pat. Off. ............... 96830173

[51] Int. Cl.$^6$ .................................................. G06G 7/00
[52] U.S. Cl. ...................................................... 706/3; 706/8
[58] Field of Search ........................... 395/3, 51; 706/3, 706/8

[56] References Cited

FOREIGN PATENT DOCUMENTS

| | | | |
|---|---|---|---|
| A-0 390 563 | 10/1990 | European Pat. Off. | G06F 9/44 |
| A-0 514 879 | 11/1992 | European Pat. Off. | G06F 7/60 |
| A-0 607 613 | 7/1994 | European Pat. Off. | G06F 7/00 |

OTHER PUBLICATIONS

European Search Report from European Patent Application 96830173.9, filed Mar. 29, 1996.

*Primary Examiner*—Tarig R. Hafiz
*Assistant Examiner*—Jeffrey S. Smith
*Attorney, Agent, or Firm*—Wolf, Greenfield & Sacks, P.C.

[57] ABSTRACT

This invention relates to a fuzzy processor having an input X for at least a plurality of input variables X-i and an output U for one or more output results U-k, and including a fuzzyfication unit FU having an input coupled to the input X, a fuzzy rule processing unit RU having an input coupled to the output of the fuzzyfication unit FU, and a defuzzyfication unit DU having an input coupled to the output of the processing unit CU and an output coupled to said output U, wherein the output of the defuzzyfication unit DU is coupled to the input of the fuzzyfication unit FU and/or to the input of the processing unit RU.

6 Claims, 3 Drawing Sheets

FUZZY PROCESSING METHOD AND A PROCESSOR IMPLEMENTING THE SAME

BACKGROUND OF THE INVENTION

1. Field of the Invention

This invention relates to a fuzzy type of processing method and to fuzzy processors for implementing the method.

2. Discussion of the Related Art

A theoretical and practical survey of fuzzy logic processing is found in a book by M. M. Gupta and T. Yamakawa entitled "Fuzzy Computing", North-Holland, 1989.

As is well known, fuzzy processing basically consists of three consecutive steps: a first fuzzyfying step, a second processing or fuzzy rule inference step, and a third defuzzyfying step.

FIG. 1 of the accompanying drawings shows a structure of a conventional fuzzy processor having an input X for a plurality of input variables X-i and an output U for one or more output results U-k. The processor includes: a fuzzyfication unit FU having an input IF coupled to the input U, and an output UF; a fuzzy rule processing unit RU having an input IR coupled to the output UF, and an output UR; and a defuzzyfication unit DU having an input ID coupled to the output UR, and an output UD coupled to the output U. Each unit FU, RU, DU is provided with a memory MF, MR, MD, respectively, for storing, for example, membership functions, fuzzyfication algorithms, rules, inference algorithms, defuzzyfication algorithms, and includes a buffer BUF for temporarily storing the results of the processing which is taking place within the unit; the various inputs and outputs may be of the parallel or the serial type, depending on application.

Processors of this kind have been known and are disclosed in U.S. Pat. No. 4,875,184 corresponding to Patent EP 268 182, in an analog version, and in U.S. Pat. No. 5,243,687 corresponding to Patent EP 360 256, in a digital version.

Furthermore, such processors are available commercially in integrated circuit form: see, for example, product designations WARP 1.1 and WARP 2.0 from SGS-THOMSON MICROELECTRONICS.

It is well recognized that, to achieve maximum versatility in fuzzy logic processing, the processor must be able to handle membership functions of all types and forms, fuzzy rules using aggregation operators of any types, as well as fuzzyfication, inference and defuzzyfication algorithms of any types.

In actual practice, it is usually preferred that only a few types of functions, operators and algorithms be selected and implemented in the processor. for reasons of constructional simplicity, speed of operation, and cost.

An object of the present invention is to expand the range of processing types available in a fuzzy logic processor.

SUMMARY OF THE INVENTION

This and other objects are achieved by a method of fuzzy logic processing input variables to obtain one or more output results comprising the steps of:

A method of fuzzy logic processing input variables to obtain one or more output results comprising the steps of:

(a) fuzzyfying elements corresponding to at least the input variables according to membership functions of a unidimensional type to generate first results;

(b) processing elements corresponding to at least the first results in conformity with fuzzy rules to generate second results; and (c) defuzzyfying elements corresponding to at least the second results to generate third results which correspond to at least the output results, wherein some of the results of step (c) are used as the elements in steps (a) and/or (b).

The invention also includes a fuzzy processor having an input for at least a plurality of input variables. A fuzzy processor having an input for at least a plurality of input variables and an output for one or more output results, comprising:

a fuzzyfication unit having an input coupled to said input;

a fuzzy rule processing unit having an input coupled to the output of said fuzzyfication unit; and a defuzzyfication unit having an input coupled to the output of said processing unit and an output coupled to said output;

wherein the output of said defuzzyfication unit is coupled to the input of said fuzzyfication unit and/or to the input of said processing unit.

The invention also includes a fuzzy processor having an input a fuzzy processor having an input for a plurality of input variables and an output for one or more output results comprising:

a fuzzyfication unit having an input coupled to said input;

a fuzzy rule processing unit having an input coupled to the output of said fuzzyfication unit;

a defuzzyfication unit having an input coupled to the output of said processing unit and an output coupled to said output;

a complex fuzzyfication unit having an input coupled to the output of said fuzzyfication unit and an output to the input of said processing unit.

The fuzzy processor is arranged for realizing, in combination with the fuzzyfication unit, a complex fuzzyfication according to a membership function of a multi-dimensional type of a group formed by at least two of the input variables is realized by simple fuzzyfication according to membership functions of the unidimensional type of the variables of the group, using subsequent processing of the results of such simple fuzzyfications in conformity with one or more fuzzy rules and further defuzzyfication of the results of said subsequent processing.

In another embodiment, the fuzzy processor is arranged for realizing, in combination with the fuzzyfication unit, a complex fuzzyfication according to a membership function of the unidimensional type of a specific one of the input variables is realized by simple fuzzyfications according to different membership functions of the unidimensional type of said specific one of the variables, using subsequent processing of the results of such simple fuzzyfications in conformity with one or more fuzzy rules and further defuzzyfication of the results of said subsequent processing.

The idea on which this invention stands is one of carrying out the elementary steps of fuzzy logic processing for as many times as required, so as to allow novel and/or more complex processing and, therefore, provide improved processing versatility.

BRIEF DESCRIPTION OF THE DRAWINGS

The invention can be better understood by reading the following detailed description in conjunction with the accompanying drawings, in which.

DETAILED DESCRIPTION

The method of this invention for the fuzzy logic processing of input variables to obtain one or more output results comprises the steps of:

a) fuzzyfying elements corresponding to at least the input variables according to membership functions of the unidimensional type to generate first results;

b) processing elements corresponding to at least the first results in conformity with fuzzy rules to generate second results; and c) defuzzyfying elements corresponding to at least the second results to generate third results which correspond to at least the output results.

Some of the results of step c) can be used, for complex processings, as the elements in steps a) and/or b) above.

The processing stream of the inventive method provides for one or more repetitions or iterations.

This method has several different applications: for example, it can serve for pipelining fuzzy rules, and hence, simple types of fuzzy processings, especially where the results of step c) are used as the elements in step a).

Another application, different in concept from the former, comprises of utilizing this method to produce processings of some new types by the use of new aggregation operators.

While in many fuzzy logic applications the standard criteria for aggregations (disjunction, conjunction, etc.) can suffice, it may be convenient to use on occasions such operator types as the OWA (Ordered Weighted Averaging) operators, or priority operators.

Any aggregation can be represented in the following form:

$$T = t_1 O^{P_{1,2}} t_2 O^{P_{2,3}} t_3 \ldots t_{n-1} O^{P_{n-1,n}} t_n$$

where, $t_i$ are starting terms of the simple unidimensional type, $OP_{i,j}$ are aggregation operators, and T is a resultant term.

Thus, the resultant term can be also viewed as a multi-dimensional term defined within the resultant range from the Cartesian product of the ranges wherein the starting terms are defined. This multi-dimensional term can be represented and realized by means of membership functions and fuzzy rules, as explained hereinafter.

An important aspect of the invention comprises of a complex fuzzyfying method which may be realized within the processing method described above and is also based on repetition or iteration.

This complex fuzzyfication is realized by simple fuzzy-fications according to membership functions of the unidimensional type, by successive processing of the results of such fuzzyfications according to one or more fuzzy rules, and by a further defuzzyfication of the results of that successive processing.

There are several possible applications for this complex fuzzyfication.

A first application corresponds to the complex fuzzyfication, according to a membership function of the multi-dimensional type, of a group formed by at least two input variables. In this case, the various unidimensional membership functions are associated with the various variables in the group.

Figure 2:
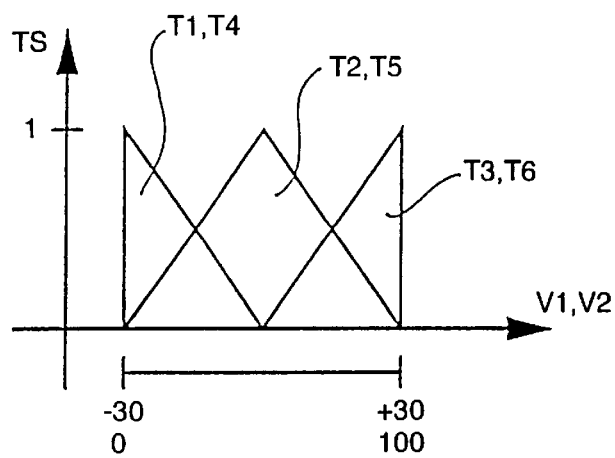
FIG. 2 shows a set of three membership functions of the unidimensional type, associated with the same input variable.
Figure 3:
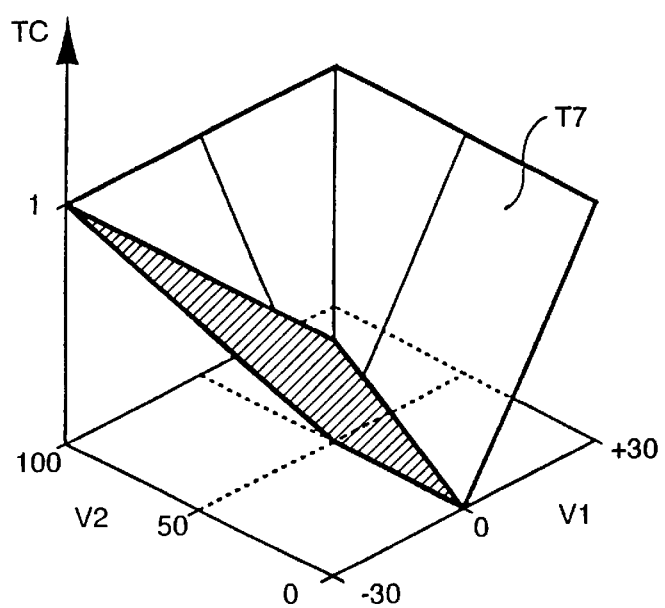
FIG. 3 shows a membership function of the multi-dimensional, specifically bidimensional, type.

Referring to FIGS. 2 and 3, let two input variables V2 and V1 be considered, such as the absolute distance of a vehicle, whose movement is to be controlled, from an obstacle as expressed in units of length, and the direction relative to the path of travel of the vehicle along which lies the obstacle as expressed in units of angle, respectively.

Shown in FIG. 2 are three membership functions per variable having values in the 0 to 1 range, as customary, which correspond to three unidimensional terms TS. The direction variable VI has the range of −30 to +30 as its universe of discourse, and three terms are associated therewith which are "left" T1, "straight-away" T2, and "right" T3, along with respective membership functions. The "distance" variable V2 has the 0-to-100 range as its universe of discourse, and three terms are associated therewith, namely "small" T4, "medium" T5 and "large" T6, along with respective membership functions. The fact that the membership functions associated with the terms T1 and T4, T2 and T5, T3 and T6 have the same form is coincidental.

Shown in FIG. 3 is a bidimensional membership function associated with a bidimensional term TC. In particular, the "safe-distance-to-the-obstacle" term T7 is defined on a universe of discourse of the bidimensional type. The implementation of the term T7 by fuzzy rules may be as follows:

IF V1 BELONGS TO T2 AND V2 DOES NOT BELONG TO T6 THEN T7=0;

IF V1 DOES NOT BELONG TO T2, THEN T7=1;

IF V2 BELONGS TO T6, THEN T7=1.

The degree of the vehicle membership with the term T7—1 for full membership, 0 for non-membership—can be used within a fuzzy logic processing to control the vehicle movement and determine, for example, the turning angle of the vehicle when the vehicle is to dodge obstacles automatically.

The above exemplification may be extended, of course, to terms having any number of dimensions.

A second application corresponds to the complex fuzzyfication, according to a unidimensional membership function, of some specific input variable. In this case, all membership functions are associated with that variable.

Figure 4:
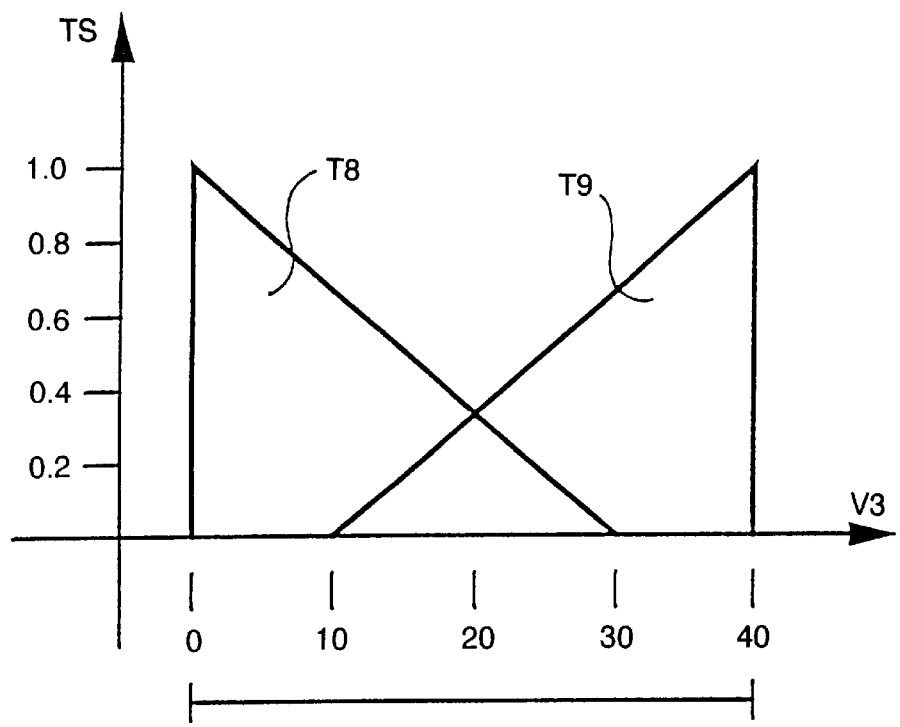
FIGS. 4 and 5 show a set of three membership functions of the unidimensional type associated with the same input variable, wherein one function has a particular form.
Figure 5:
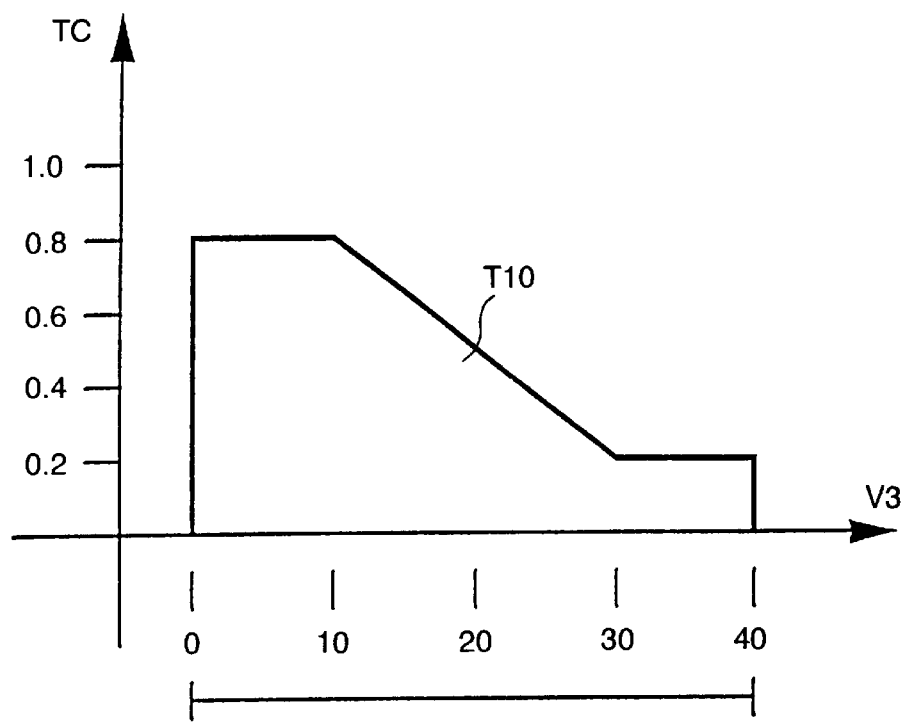

Referring to FIGS. 4 and 5, an input variable V3, such as the absolute speed of a vehicle whose movement is to be controlled, will be considered as expressed in units of speed.

FIG. 4 shows two membership functions which have values in the 0 to 1 range, as customary, corresponding to two unidimensional terms TS. The speed variable V3 has the (1-to-40 range as its universe of discourse, and two terms are associated therewith which are "low" T8 and "high" T9, with respective membership functions.

Shown in FIG. 5 is a unidimensional membership function associated with the variable V3. Specifically, the "safe-speed" term T1O is associated with a membership function having a peculiar form which can in no way be related to a triangular form or trapezoidal form, for example. The implementation of the term T10 by fuzzy rules may be the following:

IF V3 BELONGS TO T8, THEN T10=0.8;

IF V3 BELONGS TO T9, THEN T10=0.2.

In fact, within the 0-to-10 range, only the first rule applies, and therefore, T10 is, 0.8; within the 30-to-40 range, only the second rule applies, and therefore, T10 is 0.2; and within the 10-to-30 range, both rules apply, and T10 is calculated as:

$$T10(V3) = \frac{0.8 \cdot T8(V3) + 0.2 \cdot T9(V3)}{T8(V3) + T9(V3)}$$

in conformity with a customary method of realizing a defuzzyfication.

The degree of membership of the vehicle with the term T10—1 for full membership, 0 for non-membership—can then be used in a fuzzy processing to control the vehicle movement.

Understandably, the above exemplification may be extended to much more complicated membership functions, by either increasing the number of starting membership functions, or using a greater number of rules and more complicated conditions.

It can be appreciated from all of the foregoing examples, that the possibilities afforded by the combination of elementary fuzzy steps are virtually unlimited.

Figure 6:
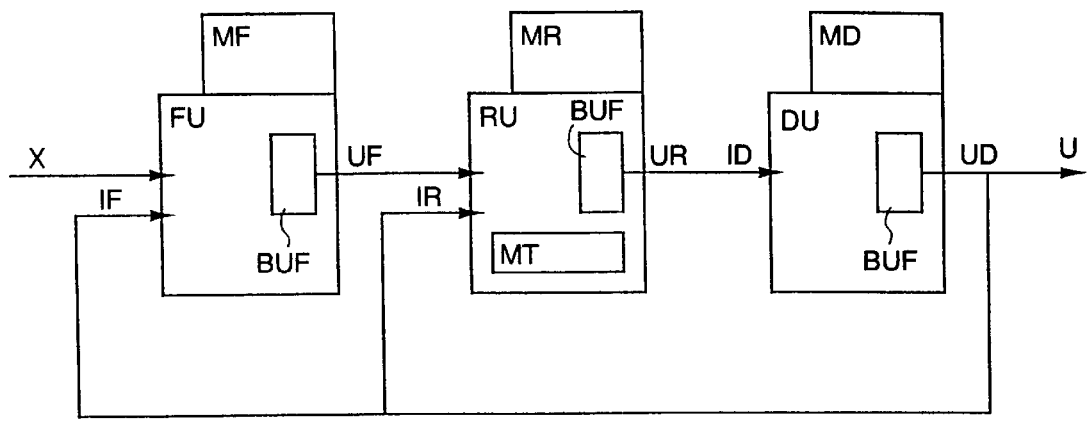
FIG. 6 shows the structure of a first fuzzy processor according to the invention.
Figure 7:
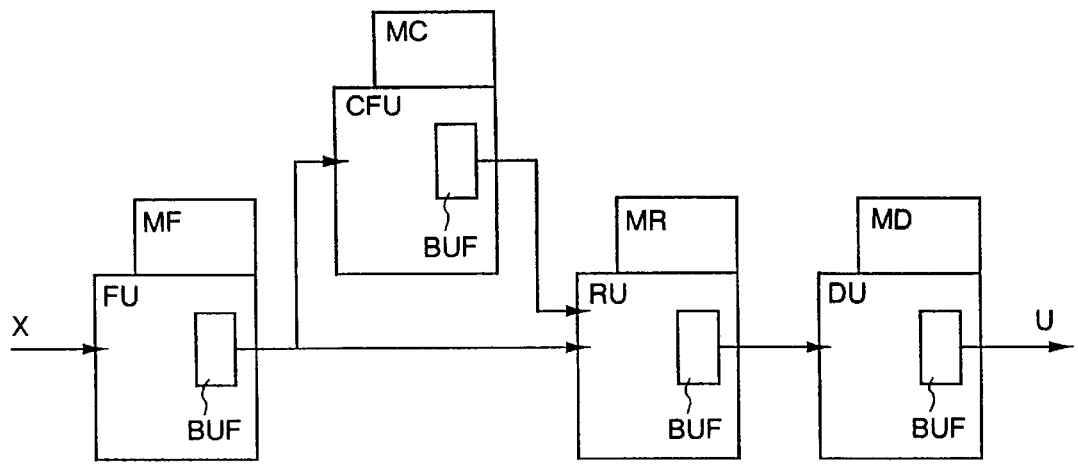
FIG. 7 shows the structure of a second fuzzy processor according to the invention.

The methods just described can be readily implemented on circuit structures like those shown in FIGS. 6 and 7.

Figure 1:
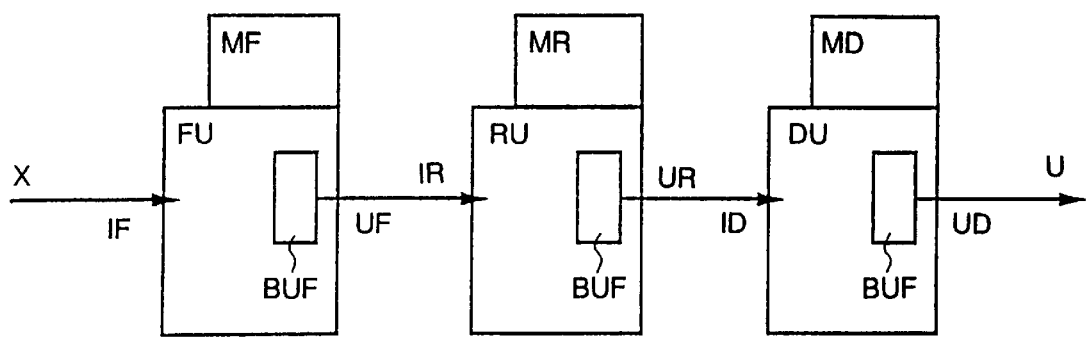
FIG. 1 shows the structure of a conventional fuzzy processor.

The fuzzy processor of FIG. 6 closely resembles that shown in FIG. 1, being provided with an input X for a plurality of input variables X-i and with an output U for one or more output results U-k, and comprises: a fuzzyfication unit FU having an input IF coupled to the input U, and an output UF; a fuzzy rule processing unit RU having an input IR coupled to the output UF, and an output UR; and a defuzzyfication unit DU having an input ID coupled to the output UR, and an output UD coupled to the output U. Each unit FU, RU, DU is provided with a memory MF, MR, MD, respectively, for storing, for example, membership functions, fuzzyfication algorithms, rules, inference algorithms, defuzzyfication algorithms, and includes a byffer BUF for temporarily storing the results of the processing carried out by the unit. The various inputs and outputs may be of the parallel or the serial type, depending on a particular application. The processings may be realized in the digital mode or in the analog mode, or partly digitally and partly analogically.

However, this processor shows a small, albeit substantial, difference whereby the methods described can be implemented, inter alia; that is, the output of the defuzzyfication unit DU is coupled to the input of the fuzzyfication unit FU and to the input of the processing unit RU.

Depending on applications and the performance expectances of the processor, one only of these couplings could be provided, although the provision of both will afford improved versatility.

Highlighted in the circuit of FIG. 6 is a buffer store MT which, where provided, can be used to advantage for storing intermediate results of the processing taking place in the unit RU or of previous complex processings.

Also highlighted in the circuit of FIG. 6 are separate input lines to the units FU and RU for results issuing from the output UD of the unit DU. This is, of course, but a possibility.

The circuit of FIG. 6 can be arranged to realize processings of any types in accordance with the inventive method.

This circuit, while allowing processings of far higher complexity than those to be realized by the circuit of FIG. 1, involves substantially no additional circuitry to the latter.

An alternative processor to that of FIG. 6 is shown in FIG. 7.

The fuzzy processor of FIG. 7 is similar to that shown in FIG. 1 and already described, but comprises additionally a complex fuzzyfication unit CFU which has an input coupled to the output of the fuzzyfication unit FU and an output coupled to the input of said processing unit RU, it being arranged for realizing, in combination with the fuzzyfication unit FU, complex fuzzyfications in accordance with the method of this invention.

The operation of the processor of FIG. 7 is similar to that of a conventional processor, when no fuzzyfications are involved, and accordingly, the results output by the unit FU will be supplied to the unit RU directly, whereas for complex fuzzyfications, such results will be supplied to the unit CFU which, after processing, delivers them to the unit RU.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of fuzzy logic processing input variables to obtain one or more output results comprising the steps of:

(a) fuzzyfying elements corresponding to at least the input variables according to membership functions of a uni-dimensional type to generate first results; (b) processing elements corresponding to at least the first results in conformity with fuzzy rules to generate second results; and (c) defuzzyfying elements corresponding to at least the second results to generate third results which correspond to at least the output results, wherein some of the results of step (c) are used as the elements in steps (a) and (b).

2. A method according to claim 1, wherein a complex fuzzyfication according to a membership function of a multi-dimensional type of a group formed by at least two of the input variables is realized by simple fuzzyfications according to membership functions of the unidimensional type of the variables of the group, using subsequent processing of the results of such simple fuzzyfications in conformity with one or more fuzzy rules and further defuzzyfication of the results of said subsequent processing.

3. A method according to claim 1, wherein a complex fuzzyfication according to a membership function of the unidimensional type of a specific one of the input variables is realized by simple fuzzyfications according to different membership functions of the unidimensional type of said specific one of the variables, using subsequent processing of the results of such simple fuzzyfications in conformity with one or more fuzzy rules and further defuzzyfication of the results of said subsequent processing.

4. A fuzzy processor having an input for at least a plurality of input variables and an output for one or more output results, comprising:

a fuzzyfication unit having an input coupled to said input;

a fuzzy rule processing unit having an input coupled to the output of said fuzzyfication unit; and a defuzzyfication unit having an input coupled to the output of said processing unit and an output coupled to said output;

wherein the output of said defuzzyfication unit is coupled to the input of said fuzzyfication unit and to the input of said processing unit.

5. A processor according to claim 4, as arranged for realizing complex fuzzyfications in accordance with the method of claim 2 or 3.

6. A fuzzy processor having an input for a plurality of input variables and an output for one or more output results, comprising:

a fuzzyfication unit having an input coupled to said input;

a fuzzy rule processing unit having an input coupled to the output of said fuzzyfication unit;

a defuzzyfication unit having an input coupled to the output of said processing unit and an output coupled to said output;

a complex fuzzyfication unit having an input coupled to the output of said fuzzyfication unit and an output to the input of said processing unit, and being arranged for realizing, in combination with said fuzzyfication unit, complex fuzzyfications in accordance with the method of claim 2 or 3.

* * * * *